Dec. 5, 1950

E. RATHJE, JR 2,532,421

LINE TRACKER CONTROL

Filed June 19, 1946

2 Sheets-Sheet 1

INVENTOR
EDWARD RATHJE, JR
BY
ATTORNEY

Dec. 5, 1950 E. RATHJE, JR 2,532,421
LINE TRACKER CONTROL
Filed June 19, 1946 2 Sheets-Sheet 2

INVENTOR
EDWARD RATHJE, JR.
BY
ATTORNEY

Patented Dec. 5, 1950

2,532,421

UNITED STATES PATENT OFFICE 2,532,421

LINE TRACKER CONTROL

Edward Rathje, Jr., Cranford, N. J., assignor to The Linde Air Products Company, a corporation of Ohio Application June 19, 1946, Serial No. 677,807

11 Claims. (Cl. 318—162)

This invention relates to line tracker control, and more particularly to method and apparatus employing a radiant energy responsive device for tracing the line to be reproduced.

In the Fowle and Kennedy Patent No. 2,397,933 the tracing or master mechanism generates voltages related in quadrature, which voltages are respectively conducted to the drive motors for the respective carriages of a milling machine. Thus the control voltage is required to move both carriages, with consequent power consumption.

It is therefore the main object of the present invention to provide a separate drive for the general tracing movement, and to employ the voltages related in quadrature for steering or controlling the direction of the tracing movement.

An example of a steerable traction wheel for shape cutting operations is disclosed in the Young Patent No. 2,172,313, in which a photoelectric tracing device is employed for energizing the reversible steering motor for the traction wheel. Upon increase of light, contacts are closed which impose the line voltage upon the armature of the steering motor, and upon decrease of light impose the line voltage upon the steering motor in the reverse direction. There is nothing in this arrangement to utilize the master voltages in space quadrature of the Fowle and Kennedy development.

It is therefore another object of the present invention to utilize the control voltages in space quadrature for steering the traction wheel of a shape cutting machine.

Figure 1:
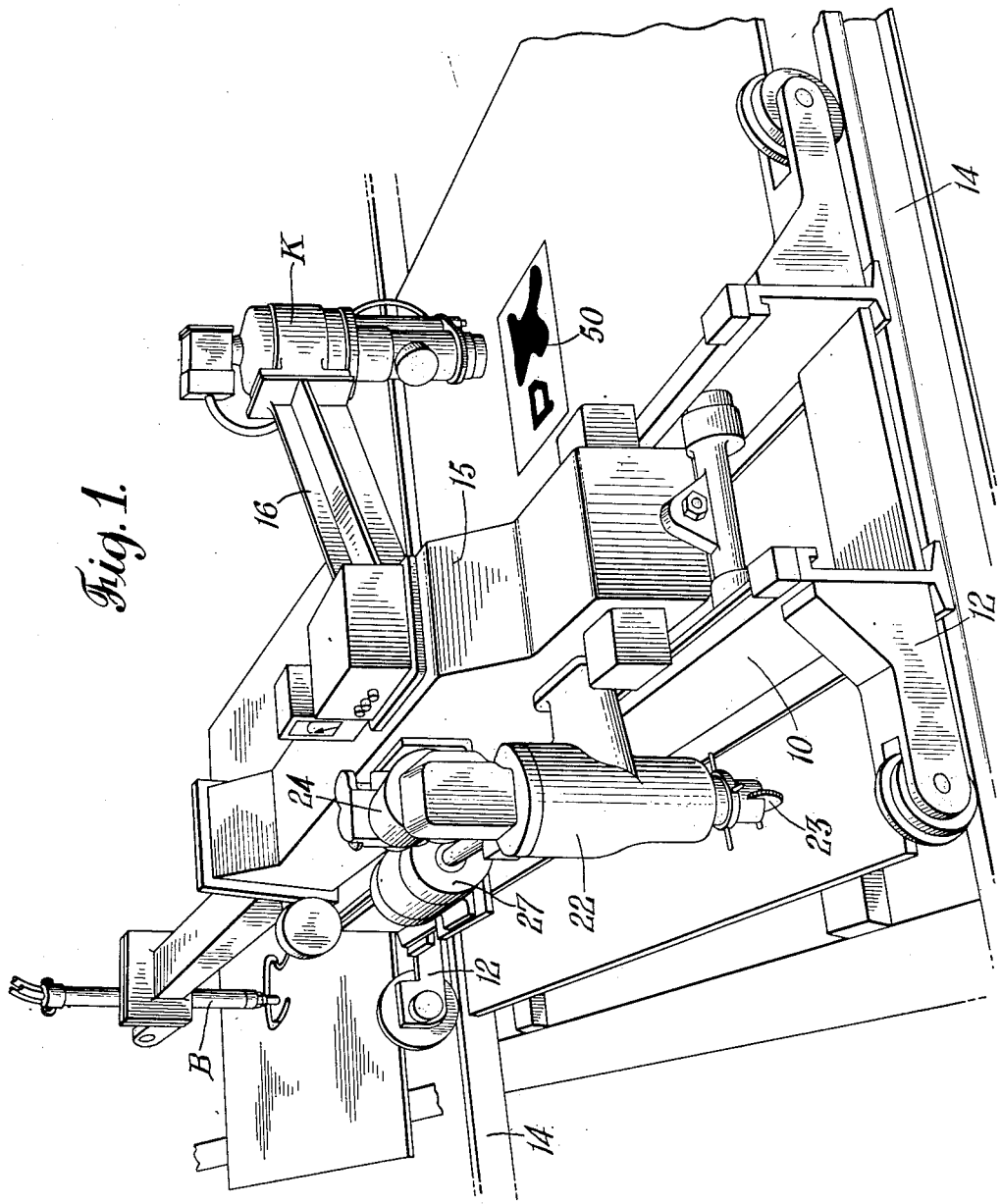
Figure 2:
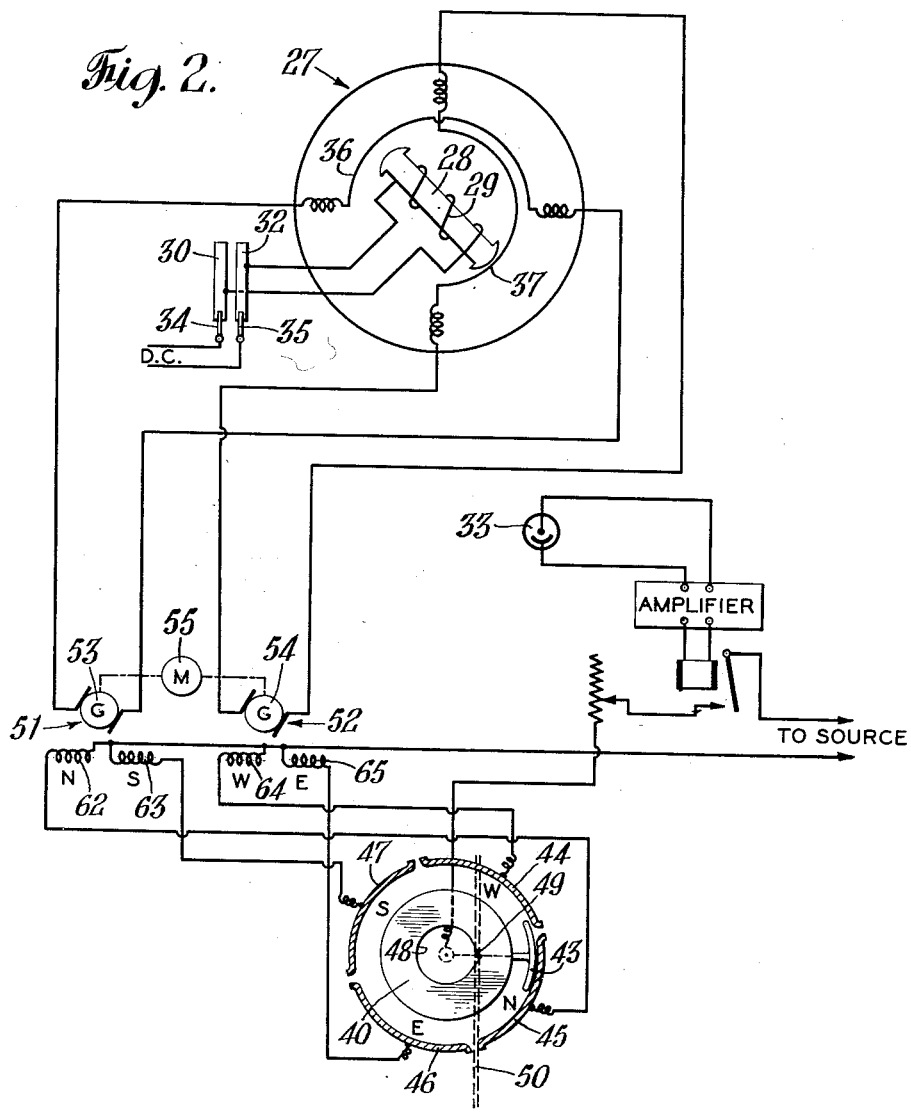

Other objects and features of novelty will be apparent as the following description proceeds, with reference to the accompanying drawings, in which Figure 1 is a perspective view of a double carriage shape cutting machine according to, and for carrying out the method of the present invention; and Figure 2 is a wiring diagram of the electrical apparatus employed in Fig. 1.

In the Fowle and Kennedy patent, particularly in the protoelectric tracing device, the light passes through a rotating shutter having a circular opening with an eccentric notch, which rotates into overlapping relation with the contour line to be traced, and energizes a photoelectric cell. Also rotating with the shutter is a shoe in series with the photoelectric cell, which contacts in succession four segments. These segments transmit control voltages in space quadrature to four coils respectively in series with the segments.

In lieu of the shoe and segment device, a synchronous motor is employed to rotate the shutter, and the successive phases of a four phase power circuit are distributed to four thermionic tubes having control circuits including the photoelectric cell so that control voltages in space quadrature may be taken off from the respective tubes.

According to the present invention, in order to utilize the control voltages related in space quadrature for turning a follower device about an axis, a positioning motor is provided which does not normally rotate at uniform speed, but rotates to an angular position with respect to the stator determined by the relative magnitude and polarity of two separate direct current voltages. This motor has a two pole rotor, utilizing either a permanent magnet or a direct current winding to produce the magnetic field of the rotor, and a stator with two separate windings placed ninety degrees apart on the stator and excited by the two unidirectional control voltages. The construction of the rotor and the stator may be interchanged without changing the operation of the motor.

Each stator winding produces a magnetomotive force proportional to the control voltage impressed across the coil. Since the two windings are displaced ninety degrees in space from each other, the two magnetomotive forces will be at right angles to each other and will add vectorially to produce a resultant magnetomotive force, thereby establishing the direction of field flux. The stator and rotor are in effect two magnets, and as such a torque is produced between them tending to rotate the rotor until its lines of force be in the same direction as the lines of force of the stator field. Thus by varying the relative magnitudes of the two stator voltages, the rotor can be made to assume any desired position. A convenient method of controlling the position of the motor shaft is to vary the two stator control voltages as sine and cosine functions respectively of the desired angular position of the motor shaft. This sine and cosine relationship of the control voltages is inherent in the Fowle and Kennedy photoelectric tracing system.

In the present utilization of the Fowle and Kennedy system of phototube tracing, the output control voltages are fed into the fields of two generators to obtain power amplification and to combine the four control voltages N, S, E, W into two resultant voltages N—S and E—W. The stator fields of the positioning motor are connected to the output control voltages of the Fowle and Kennedy amplifier, or across the armatures of the respective generators, so that any change in the relative magnitudes of the control voltages, which change when the contour being traced changes direction, will cause the positioning motor, and therefore the plane of the traction wheel, to rotate through the same number of degrees as the direction of travel of the tracer has changed, thereby keeping the plane of the traction wheel parallel to the instantaneous tangent to the contour at the point sensed by the phototube.

As shown in Figure 1 the shape cutting machine comprises a main carriage 10 mounted on trucks 12 rolling on rails 14. A cross carriage 15 is slidably mounted on the main carriage 10, and carries an oxy-fuel blowpipe B.

The cross carriage 15 has an arm 16 which supports a photoelectric tracing device K according to the aforesaid Fowle and Kennedy patent, which is adapted to trace a contour line 50. The cross carriage 15 also supports a tracer head 22 in which is rotatably mounted a traction wheel 23, which is driven at constant speed through suitable gearing by a motor 24. The traction wheel is steered by a motor 27 mounted on the upper carriage 15.

As shown in Fig. 2 the tracing device K comprises a rotary shutter 40 having a circular orifice 48 with an eccentric notch 49, which rotates into overlapping relation with the translucent contour line 50. The light passes through the overlap into the photoelectric cell 33, which energizes a circuit through a shoe 43 attached to the rotating shutter 40, and thence through the segment 44, 45, 46, or 47 with which the shoe is in contact, and the generator field coil 62, 63, 64 or 65 with which the segments are respectively in series. The respective generators 51, 52 have armatures 53, 54 rotated by a common motor 55.

The steering motor 27 has a rotor 28 with a two pole direct current winding 29 to which a constant direct current voltage is supplied through a pair of collector rings 30 and 32 and a pair of brushes 34 and 35. The stator of the motor 27 has two separate windings 36 and 37 spaced ninety degrees apart on the stator. The winding 36 is connected to the generator armature 53 and the winding 37 is connected to the generator armature 54.

Inasmuch as the pairs of opposite segments 45, 47 and 44, 46 are ninety degrees apart, the control voltage of the generator armature 53 is a function of the sine of the angle which the direction of travel of the tracer K makes with the rails 14 and the control voltage of the generator armature 54 is a function of the cosine of that angle. The reaction between the resultant field of the two stator windings 36 and 37 and the rotor field causes the control voltages to be added vectorially and thereby causes the rotor to assume the angle with respect to the stator which corresponds to the direction of travel of the tracer K.

What is claimed is:

1. Apparatus for line tracker control, which comprises a steerable member having a tracer thereon, a first motor coupled to said steerable member for propelling the same over a plane surface, means for relatively moving a contour and said tracer into alternately increasing and decreasing intercepting relation in cycles of uniform frequency as said tracer is propelled along the contour; means for varying the amounts of such increases and decreases in accordance with changes in direction of the contour, means for generating separate voltages in space quadrature proportional to changes in the amounts of such increases and decreases, and a second motor coupled to said steerable member for steering the same, said second motor having separate windings spaced ninety degrees apart and energized respectively by said voltages.

2. Apparatus for line tracker control, which comprises a steerable member having a tracer thereon, a first motor coupled to said steerable member for propelling the same over a plane surface, means for relatively moving a contour and a tracer into alternately increasing and decreasing intercepting relation in cycles of uniform frequency; as said tracer is propelled along the contour; means for varying the amounts of such increases and decreases in accordance with changes in direction of the contour, means for generating separate voltages in space quadrature proportional to changes in the amounts of such increases and decreases, and a second motor coupled to said steerable member for steering the same, said second motor having separate windings spaced ninety degrees apart and energized respectively by said voltages.

3. Apparatus for line tracker control, which comprises a steerable member having a tracer thereon which comprises means for directing a stream of energy against a contour, a first motor coupled to said steerable member for propelling the same over a plane surface, means for relatively moving said contour and said stream of energy into alternately increasing and decreasing overlapping relation in cycles of uniform frequency as said tracer is propelled along the contour; means for varying the amounts of such increases and decreases in accordance with changes in the direction of the contour; means for generating voltages in space quadrature in accordance with the proportion of energy escaping said contour to the portion affected thereby, and a second motor coupled to said steerable member for steering the same, said second motor having separate windings spaced ninety degrees apart and energized respectively by said voltages.

4. Apparatus for line tracker control, which comprises a steerable member having a tracer thereon, a first motor coupled to said steerable member for propelling the same over a substantially plane surface; means for relatively moving a contour and said tracer into alternately increasing and decreasing overlapping relation in cycles of uniform frequency as said tracer is propelled along the contour; means for varying the amounts of such increases and decreases in accordance with changes in direction of the contour with respect to said tracer; means for generating voltages in space quadrature in accordance with changes in the amounts of such increases and decreases; and a second motor coupled to said steerable member for steering the same by swinging said steerable member about an axis in response to such voltage, said second motor having separate windings spaced ninety degrees apart and energized respectively by said voltages.

5. Apparatus for line tracker control, which comprises a steerable rolling contact member carrying a tracer, a first motor coupled to said steerable rolling contact member for rotating the same over a substantially plane surface at substantially uniform speed; means for relatively moving said tracer and a contour as said tracer is propelled along the contour; means for generating separate voltages related in space quadrature proportional to changes in direction of the contour to be reproduced; and a second motor for swinging said rolling contact member about an axis substantially normal to said surface in response to the vectorial sum of said voltages, said second motor having separate windings spaced ninety degrees apart and energized respectively by said voltages.

6. Apparatus for line tracker control, which comprises a steerable traction wheel having a tracer thereon comprising means for directing a stream of energy against a contour, a first motor coupled to said wheel for propelling the same at substantially uniform speed over a substantially plane surface and thereby relatively moving said contour and said stream of energy along the contour; means for continuously relatively rotating said contour and stream of energy into alternately increasing and decreasing overlapping relation; means for varying the amounts of such increases and decreases in accordance with changes in direction of the contour; means for generating voltages related in quadrature in accordance with the proportions of energy escaping said contour to the portion affected thereby; and a second motor for swinging said steerable traction wheel about an axis substantially normal to said surface in response to the vectorial sum of said voltages, said second motor having separate windings spaced ninety degrees apart and energized respectively by said voltages.

7. Apparatus for line tracker control, which comprises a steerable member having a photoelectric tracer thereon, a first motor coupled to said steerable member for propelling the same over a substantially plane surface; means for relatively rotating said tracer and a contour as said tracer is propelled along the contour; means for generating separate voltages in space quadrature in accordance with changes in direction of the contour with respect to said tracer, and a second motor coupled to said steerable member for steering the same, said second motor having separate windings spaced ninety degrees apart and energized respectively by said voltages.

8. Apparatus for line tracker control, which comprises a steerable member having a photoelectric tracer thereon, a first motor coupled to said steerable member for propelling the same over a substantially plane surface; means for relatively moving a contour and said photoelectric tracer as said tracer is propelled along the contour; means for generating separate voltages in space quadrature in accordance with changes in the direction of said contour with respect to said tracer, and a second motor coupled to said steerable member for steering the same, said second motor having separate windings spaced ninety degrees apart and energized respectively by said voltages.

9. Apparatus for line tracker control, which comprises a steerable member having a tracer thereon, a first motor coupled to said steerable member for propelling the same over a plane surface, means for relatively moving said tracer and a contour as said tracer is propelled along the contour, means for generating separate voltages in space quadrature in accordance with changes in direction of said contour with respect to said tracer, and a second motor coupled to said steerable member for steering the same, said second motor having separate windings spaced ninety degrees apart and energized respectively by said voltages.

10. Apparatus for line tracker control, which comprises a steerable member having a photoelectric tracer thereon, a first motor coupled to said steerable member for propelling the same over a plane surface, means for relatively moving said tracer and a contour as said tracer is propelled along the contour, means for generating voltages in space quadrature controlled by said photoelectric tracer in accordance with changes in direction of said contour with respect to said tracer, and a second motor coupled to said steerable member for steering the same, said second motor having separate windings spaced ninety degrees apart and energized respectively by said voltages.

11. Apparatus for line tracker control, which comprises a steerable member having a tracer thereon comprising a rotary shutter having an eccentric orifice interposed between a source of light and a photoelectric cell, a first motor coupled to said steerable member for propelling the same over a plane surface, means for relatively moving said tracer and a contour as said tracer is propelled along the contour, means for generating voltages in space quadrature controlled by said photoelectric cell in accordance with changes in direction of said contour with respect to said tracer, and a second motor coupled to said steerable member for steering the same, said second motor having separate windings spaced ninety degrees apart and energized respectively by said voltages, and said means for relatively moving said tracer and contour comprising a third motor for rotating said shutter.

EDWARD RATHJE, Jr.

REFERENCES CITED

The following references are of record in the file of this patent:

UNITED STATES PATENTS

| Number | Name | Date |
|---|---|---|
| 729,269 | Buck | May 26, 1903 |
| 2,089,015 | Bucknam et al. | Aug. 3, 1937 |
| 2,121,211 | Padva et al. | June 21, 1938 |
| 2,172,313 | Young | Sept. 5, 1939 |
| 2,225,821 | Cook | Dec. 24, 1940 |
| 2,226,677 | Vikhman | Dec. 31, 1940 |
| 2,261,644 | Cockrell | Nov. 4, 1941 |
| 2,331,337 | Meyer | Oct. 12, 1943 |
| 2,397,933 | Fowle et al. | Apr. 9, 1946 |